US009382798B2

(12) United States Patent
Lundh et al.

(10) Patent No.: US 9,382,798 B2
(45) Date of Patent: Jul. 5, 2016

(54) METHOD AND SYSTEM FOR FLUID FLOW CONTROL IN A FLUID NETWORK SYSTEM

(71) Applicant: ABB Research Ltd., Zurich (CH)

(72) Inventors: Michael Lundh, Vasteras (SE); Jan Nyqvist, Vasteras (SE)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 14/096,883

(22) Filed: Dec. 4, 2013

(65) Prior Publication Data

US 2014/0094105 A1  Apr. 3, 2014

Related U.S. Application Data

(63) Continuation of application No. PCT/EP2011/060061, filed on Jun. 16, 2011.

(51) Int. Cl.
*E21F 1/00* (2006.01)
*E21F 1/02* (2006.01)
*G05D 7/06* (2006.01)

(52) U.S. Cl.
CPC ... *E21F 1/00* (2013.01); *E21F 1/02* (2013.01); *G05D 7/0617* (2013.01); *G05D 7/0676* (2013.01); *G05D 7/0682* (2013.01); *Y10T 137/0318* (2015.04)

(58) Field of Classification Search
CPC .......... E21F 1/00; E21F 1/02; G05D 7/0617; G05D 7/0676; G05D 7/0682; F04C 28/08; F24F 11/0001; F24F 11/0079; F24F 11/025
USPC .......... 454/168; 417/2, 44.1; 137/1; 700/276, 700/277
See application file for complete search history.

(56) References Cited

U.S. PATENT DOCUMENTS 4,181,099 A  *  1/1980  Binstock .......................... 417/28
5,269,660 A    12/1993  Pradelle
(Continued)

FOREIGN PATENT DOCUMENTS

DE     1463044 A1      1/1969
EP     2746888 A1 *    6/2014
(Continued)

OTHER PUBLICATIONS

Laboratory Methods of Testing Fans for Aerodynamic Performance Rating, ANSI/AMCA 210-99, ANSI/ASHRAE 51/1999, Air Movement and Control Association International, Inc., 2000.*
(Continued)

*Primary Examiner* — Alissa Tompkins
*Assistant Examiner* — Phillip E Decker
(74) *Attorney, Agent, or Firm* — Whitmyer IP Group LLC

(57) ABSTRACT

A method of controlling fluid flow in a fluid network system by means of a plurality of fluid machines. The disclosure provides a simple empirical method of identifying network characteristics of the fluid network system used for providing the required fluid flow rate in the fluid network system utilizing minimal fluid machine power. The method includes the steps of determining a relation between a change in fluid machine speed and a corresponding change in fluid flow rate for each of the plurality of fluid machines empirically; determining a minimum total fluid machine power which provides a minimum required flow rate in the fluid network system based on a constraint involving the relation between the fluid flow rate and the corresponding fluid machine speed, and controlling a speed of the plurality of fluid machines such that the minimum total fluid machine power in the fluid network system is attained.

18 Claims, 2 Drawing Sheets

(56) References Cited

U.S. PATENT DOCUMENTS

| | | | |
|---|---|---|---|
| 5,566,709 A | 10/1996 | Fujii et al. | |
| 5,669,811 A | 9/1997 | Zaniewski | |
| 5,743,714 A * | 4/1998 | Drob | 417/2 |
| 5,743,715 A * | 4/1998 | Staroselsky et al. | 417/6 |
| 6,725,132 B2 * | 4/2004 | Frankel et al. | 700/300 |
| 7,657,161 B2 * | 2/2010 | Jeung | 454/228 |
| 7,866,312 B2 * | 1/2011 | Erdmann | 454/61 |
| 7,880,421 B2 * | 2/2011 | Karwath | 318/644 |
| 8,356,983 B2 * | 1/2013 | Shizuo et al. | 417/44.11 |
| 2008/0119126 A1 * | 5/2008 | Shizuo et al. | 454/75 |
| 2009/0134823 A1 * | 5/2009 | Jeung | 417/20 |
| 2009/0314082 A1 * | 12/2009 | Sujan | F01D 17/06 73/497 |
| 2010/0077776 A1 * | 4/2010 | Takenami et al. | 62/98 |
| 2010/0105308 A1 * | 4/2010 | Masse | 454/168 |
| 2011/0046790 A1 * | 2/2011 | Miller et al. | 700/276 |
| 2012/0010757 A1 * | 1/2012 | Francino et al. | 700/291 |
| 2012/0041604 A1 * | 2/2012 | Isaksson et al. | 700/277 |
| 2012/0171050 A1 * | 7/2012 | Havard, Jr. | 417/44.1 |
| 2012/0312885 A1 * | 12/2012 | Tomlinson et al. | 237/12 |
| 2015/0133043 A1 * | 5/2015 | Patel | F24F 11/0001 454/258 |
| 2015/0159905 A1 * | 6/2015 | Lau | F24F 11/027 62/89 |
| 2015/0337849 A1 * | 11/2015 | Lundh | E21F 1/02 700/282 |
| 2015/0354845 A1 * | 12/2015 | Brown | F24F 11/0001 165/237 |

FOREIGN PATENT DOCUMENTS

| | | | |
|---|---|---|---|
| RU | 2315917 C2 | 1/2008 | |
| WO | WO-00/36275 A1 * | 6/2000 | E21F 1/00 |
| WO | 2009027815 A2 | 3/2009 | |
| WO | WO2012/097437 A1 * | 7/2012 | |

OTHER PUBLICATIONS

International Search Report and Written Opinion of the International Searching Authority Application No. PCT/EP2011/060061 Completed: Feb. 3, 2012; Mailing Date: Feb. 15, 2012 8 pages.

* cited by examiner

METHOD AND SYSTEM FOR FLUID FLOW CONTROL IN A FLUID NETWORK SYSTEM

FIELD OF THE INVENTION

The present disclosure relates to fluid network systems and in particular to ventilation control in such systems.

BACKGROUND OF THE INVENTION

Large fluid network systems can in some applications consume substantial amounts of energy. An example of such a fluid network system is a ventilation system of an underground mine. Such a ventilation system can comprise a plurality of fans which need to be operated in order to maintain sufficient air quality for healthy working conditions in the mine.

Ventilation on demand (VOD) control is sometimes utilized today to reduce the amount of consumed energy in underground mines. In short VOD means that fresh air is directed to specific locations in the underground mine only when needed and at sufficient amount to achieve a healthy working environment. Attempts to use network models, i.e. models that describe fluid dynamical characteristics of the underground mine network, have been done but these suffer from sensitivity for changes in the infrastructure of the mine, and require a substantial engineering effort to be commissioned.

WO2009/027815 discloses a mine ventilation system which establishes a dynamic ventilation demand as a function of real-time tracking of machinery and/or personnel location and where this demand is distributed in the work zones via the mine ventilation network and where the energy required to ventilate is minimized while satisfying the demand for each work zone. The mine ventilation system operates on the basis of a predictive dynamic simulation model of the mine ventilation network along with emulated control equipment such as fans and air flow regulators.

However, the determining of the dynamic simulation model of the mine is a complicated process which must be repeated every time the infrastructure of the underground mine is modified.

SUMMARY OF THE INVENTION

A general object of the present disclosure is to simplify the identification of network characteristics of a fluid network system.

Another object is to minimize the electric power consumption of a fluid network system while being able to provide sufficient fluid flow in the said system.

Hence, according to a first aspect of the present disclosure there is provided a method of controlling fluid flow in a fluid network system by means of a plurality of fluid machines, wherein the method comprises:

a) determining a relation between a change in fluid machine speed and a corresponding change in fluid flow rate for each of the plurality of fluid machines empirically, b) determining a minimum total fluid machine power which provides a minimum required flow rate in the fluid network system based on a constraint involving the relation between the fluid flow rate and the corresponding fluid machine speed, and c) controlling a speed of the plurality of fluid machines such that the minimum total fluid machine power in the fluid network system is attained.

Hence, simple network identification of the fluid network system is possible by empirically determining the relation between the change in fluid machine speed and the corresponding change in fluid flow rate for each fluid machine in an existing fluid network system. This identification process can easily be repeated when the infrastructure of the fluid network system has been modified, e.g. expanded, by repeating step a) above. The determined relation can be utilized to determine a total minimum electric power to be provided to the fluid machines in the fluid network system by means of optimization, while being able to provide a minimum required fluid flow in the fluid network system.

One embodiment comprises changing a fluid machine speed of each of the plurality of fluid machines prior to determining the relation in step a). By changing the fan speed of each fluid machine, the said relation between the change in fluid machine speed and the corresponding change in fluid flow rate can be determined for each fluid machine. Thereby network characteristics involving each fluid machine can be obtained.

One embodiment comprises applying an input signal pattern to the plurality of fluid machines to thereby change the fluid machine speed of the plurality of fluid machines, which input signal pattern is applied in such a way that the relation between the change in fluid machine speed and the corresponding change in fluid flow rate can be determined for each fluid machine.

In one embodiment the input signal pattern is such that it allows settling a fluid flow in the fluid network system, wherein the steps applied to the plurality of fluid machines are kept track of.

In one embodiment the changing involves sequentially changing the fluid machine speed of each of the plurality of fluid machines.

In one embodiment the sequential changing involves changing the fluid machine speed of each fluid machine such that only one fluid machine of the plurality of fluid machines is subject to a change in fluid machine speed at a time.

One embodiment comprises waiting between two subsequent fluid machine speed changes until a fluid flow in the fluid network system returns to an original state in which the fluid network system operated prior to the step of changing a fluid machine speed.

Thereby only the fan which is currently subjected to a fluid machine speed change provides measurement data for determining the relation between fluid machine speeds and fluid flow rates.

In one embodiment the step a) comprises determining a constant matrix defining the relation between the change in fluid machine speed and the corresponding change in fluid flow rate.

One embodiment comprises utilizing fluid machine characteristics for determining the minimum total fluid machine power. Beneficially, fluid machine characteristics such as fan characteristics for fluid machines in the form of fans provided by the fan manufacturer can be utilized to determine the electric power consumed by each fluid machine for a specific fluid flow rate, and consequently the fluid machine characteristics can advantageously be utilized for determining the minimum total fluid machine power. The fluid machine characteristics are advantageously loaded and stored in the control system in which the algorithm or method presented herein is executed.

In one embodiment step b) involves minimizing the sum of each individual fluid machine power.

In one embodiment the fluid network system is a ventilation system of an underground mine and wherein the fluid machines are fans.

In one embodiment the step a) of determining comprises determining a relation between the change in fluid machine speed and a corresponding change in fluid machine power for each of the plurality of fluid machines.

One embodiment comprises:

in step b) of determining:

b1) estimating a minimum total fluid machine power which provides a minimum required flow rate in the fluid network system (1) based on the relation between the change in fluid machine speed and the corresponding change in fluid machine power for each of the plurality of fluid machines with a constraint involving the relation between the fluid flow rate and the corresponding fluid machine speed;

and, after the step c) of controlling:

iterating the step b1) of estimating and the step c) of controlling until the difference between successive estimated minimum total fluid machine power values obtained in the iteration process is less than a predetermined value.

In a second aspect of the present disclosure there is provided a computer program product comprising a computer readable medium on which computer code is stored, which computer code when executed performs the method according to the first aspect presented herein.

In a third aspect of the present disclosure there is provided a control system for fluid flow control in a fluid network system comprising a plurality of fluid machines, which control system comprises:

a processing system arranged to determine a relation between a change in fluid machine speed and a corresponding change in fluid flow rate for each of the plurality of fluid machines empirically, the processing system being arranged to determine for each fluid machine a minimal power which provides a minimum required flow rate in the fluid network system based on a constraint involving the relation between the fluid flow rate and the corresponding fluid machine speed, wherein the control system is arranged to control a speed of the plurality of fluid machine such that the minimum total fluid machine power in the fluid network system is attained.

In one embodiment the processing system is arranged to apply an input signal pattern to the plurality of fluid machines to thereby change the fluid machine speed of the plurality of fluid machines, which input signal pattern is applied in such a way that the relation between the change in fluid machine speed and the corresponding change in fluid flow rate can be determined for each fluid machine.

In one embodiment the input signal pattern is such that it allows settling of a fluid flow in the fluid network system, wherein the steps applied to the plurality of fluid machines are kept track of.

In one embodiment the processing system is adapted to determine a relation between the change in fluid machine speed and a corresponding change in fluid machine power for each of the plurality of fluid machines.

In one embodiment the processing system is adapted to estimate a minimum total fluid machine power which provides a minimum required flow rate in the fluid network system based on the relation between the change in fluid machine speed and the corresponding change in fluid machine power for each of the plurality of fluid machines with a constraint involving the relation between the fluid flow rate and the corresponding fluid machine speed; wherein the control system is adapted to iterate estimation and control of the fluid machine speeds until the difference between successive estimated minimum total fluid machine power values obtained in the iteration process is less than a predetermined value.

Additional features and advantages will be disclosed in the following.

BRIEF DESCRIPTION OF THE DRAWINGS

The invention and the advantages thereof will now be described by way of non-limiting examples, with reference to the accompanying drawings of which.

DETAILED DESCRIPTION OF THE INVENTION

In the following description, for purpose of explanation and not limitation, specific details are set forth, such as particular techniques and applications in order to provide a thorough understanding of the present disclosure. However, it will be apparent for a person skilled in the art that the present disclosure may be practiced in other embodiments that depart from these specific details. In other instances, detailed description of well-known methods and apparatuses are omitted so as not to obscure the description with unnecessary details.

The present disclosure may be utilized for fluid flow control in a fluid network system such as a ventilation system of an underground mine, a building ventilation system, district heating/cooling, a drainage system for e.g. underground mines and similar systems, as would be apparent to the person skilled in the art. For illustrative purposes only, the fluid network system will in the following be exemplified by a ventilation system of an underground mine. However, the methods and systems disclosed herein may equally well be implemented in other fluid network systems.

In general, the fluid flowing through the fluid network system may be a gas such as air, or a liquid such as water depending on the application.

Beneficially, the methods and control systems presented herein provide control of fluid machines in a fluid network system in such a way that the total power consumption of the fluid machines can be minimized while the provided fluid flow satisfies the minimum required fluid flow rate in the fluid network system.

Depending on the application, a fluid machine can be a fan or a pump. If the application concerns ventilation, the fluid machines are fans. If the application relates to fluid flow control of liquids, the fluid machines are pumps.

In the following disclosure, an example of an application will be given for an underground mine ventilation system. It is however to be noted, that the present methods and control systems can also be utilized in other fluid network systems, as previously mentioned. It is thus noted that the below explained method steps and control system which implements the method in a mine ventilation application can also be applied in a similar way in other applications concerning both gas and liquid flow control, wherein in the latter case the fans are exchanged for pumps.

Figure 1:
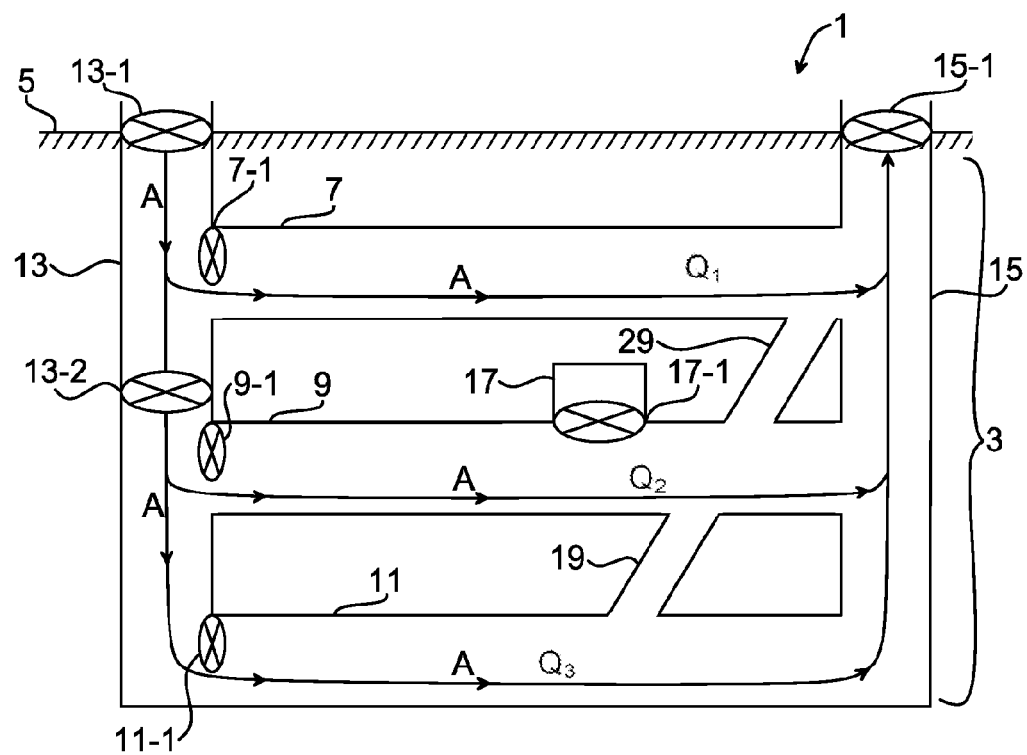
FIG. 1 schematically shows an example of a fluid network system.

FIG. 1 shows an example of an infrastructure of a fluid network system 1, i.e. a ventilation system of an underground mine. The fluid network system 1 has an underground infrastructure 3 below a ground surface 5. The fluid network system 1 comprises a plurality of shafts 7, 9 and 11. The shafts 7, 9, 11 define different shaft levels in the underground infrastructure 3. In the present case the first shaft 7 defines a first shaft level. The second shaft 9 defines a second shaft level. The third shaft 11 defines a third shaft level. In each shaft, a unique fluid flow rate requirement may be necessary, as exemplified by the different fluid flow rates $Q_1$, $Q_2$ and $Q_3$. The required fluid flow rate may for instance depend on mining vehicles present in a shaft.

The exemplified fluid network system 1 further comprises a downcast shaft 13 which extends from above the ground surface 5 and connects with shafts 7, 9 and 11 below the ground surface 5. The downcast shaft 13 has an intake fan 13-1 which provides air from the surface atmosphere to the underground infrastructure 3. The downcast shaft 13 optionally also has one or more pressure increasing fans 13-2 for increasing the air pressure deeper down in the underground infrastructure 3. The fluid network system 1 also has an air outtake shaft, i.e. an upcast shaft 15 which provides exhaust air to the surface atmosphere via an outtake fan 15-1. Hence, fresh air enters the fluid network system 1 via the intake fan 13-1 and downcast shaft 13, wherein the fresh air is distributed in the shafts 7, 9 and 11 according to airflow requirements, and exhaust air exits the fluid network system 1 via the upcast shaft 15 and outtake fan 15-1, as shown by arrows A.

The fluid network system 1 can optionally further comprise extraction zones, such as extraction zone 17 connected to the shaft 9, and ramps 19, 29. Mining can be performed in the extraction zone 17 and/or any of the shafts 7, 9, and 11. The ramps 19, 29 enable movement of equipment such as mining vehicles and the like from one level to another. In the exemplified fluid network system 1, ramp 19 connects the third shaft 11 with the second shaft 9. Ramp 29 connects the second shaft 9 with the first shaft 7.

Each shaft 7, 9, 11 is provided with a respective fan 7-1, 9-1 and 11-1. The fans 7-1, 9-1 and 11-1 provide fresh air from the downcast shaft 13 to their respective shaft 7, 9, 11. Furthermore, the extraction zone 17 is associated with a fan 17-1 which provides fresh air to the extraction zone 17 from shaft 9 to which the extraction zone 17 is connected.

There could of course be fewer or more shafts, upcast shafts, downcast shafts, extraction zones and fans in an underground mine in which ventilation control according to the present disclosure can be utilized.

Having now described a simplified example of an underground infrastructure of a fluid network system, the functioning thereof with regards to ventilation will be described in the following with reference to FIGS. 2-4.

Figure 2:
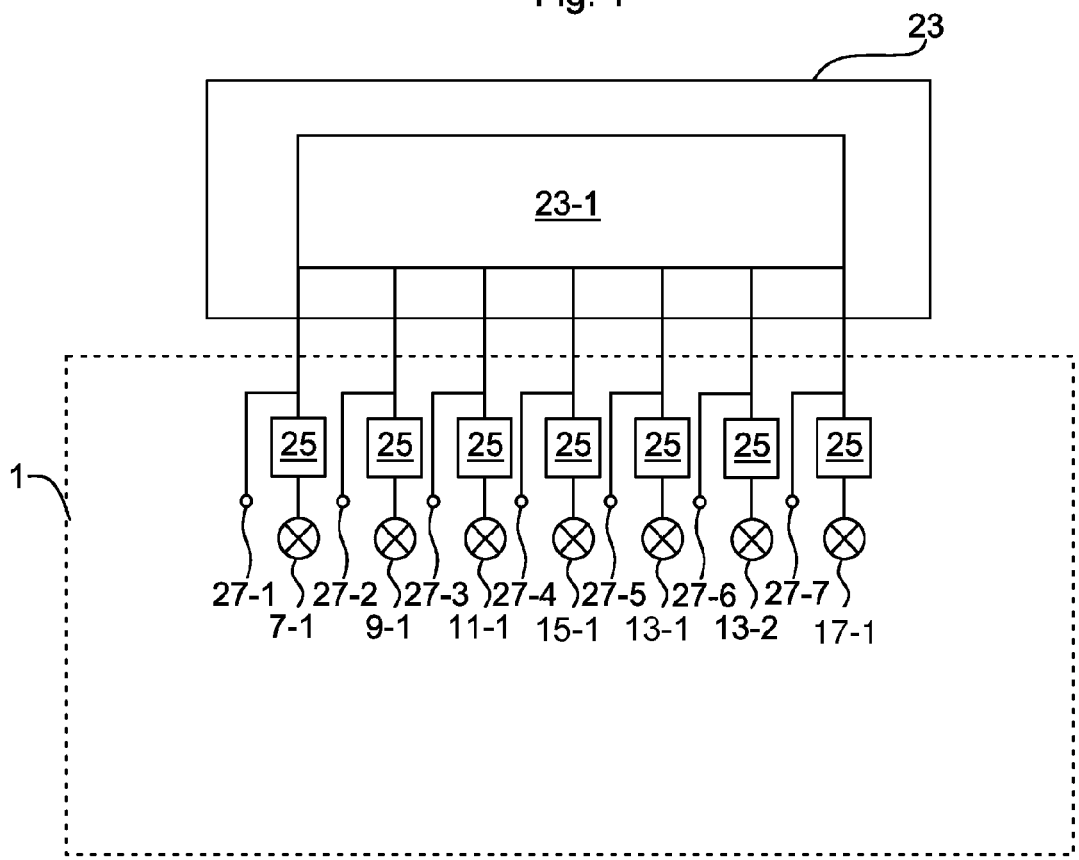
FIG. 2 is a schematic block diagram of a control system for a fluid network system.

FIG. 2 shows an example of a control system 23 for ventilation control in the fluid network system 1. The control system 23 comprises a processing system 23-1. When in operation the control system 23 is connected to the fluid network system which it is to control.

Control system 23 is an example of a control system arranged to determine network characteristics, i.e. a model of a fluid network system such as fluid network system 1.

Based on the determined network characteristics the control system 23 provides control of the rotational speed of the fans 7-1, 9-1, 11-1, 13-1, 13-2, 15-1 and 17-1 in the fluid network system 1 in such a way that the minimum fluid flow requirements in the shafts 7, 9, 11, and extraction zone 17 and hence in the fluid network system 1 are fulfilled while the fans 7-1, 9-1, 11-1, 13-1, 13-2, 15-1 and 17-1 consume a minimal amount of electric power.

The processing system 23-1 may be an integrated system comprising a single processor for the control of all fans of the fluid network system. Alternatively, the processing system may form a distributed system with an individual processor for each fan. The processing system 23-1 is preferably implemented in software. The control system 23 may be a hardware device which allows user interaction between e.g. an operator or engineer and the fluid network system.

The control system 23 operates fans 7-1, 9-1, 11-1, 13-1, 13-2, 15-1 and 17-1 via a respective motor 25. Each motor 25 is adapted to drive the rotor or rotors of its associated fan. Each fan 7-1, 9-1, 11-1, 15-1, 13-1, 13-2, and 17-1 is associated with a respective sensor 27-1, 27-2, 27-3, 27-4, 27-5, 27-6 and 27-7. Each sensor is arranged to measure a fluid flow rate change in a fluid flow channel, e.g. shaft, in which the corresponding fan is arranged. For instance, sensor 27-1 is arranged to measure the fluid flow rate in a fluid flow channel in which fan 7-1 is arranged, i.e. in shaft 7. The remaining sensor/fan pairs are arranged similarly.

An alternative way to determine the fluid flow rate change is to measure the differential pressure over each fan by means of a respective sensor and utilize the fan characteristics of the fans to estimate the fluid flow rate changes. The fan characteristics are preferably loaded into the processing system for this purpose.

Each fan 7-1, 9-1, 11-1, 13-1, 13-2, 15-1 and 17-1 is via a respective motor 25 arranged in communication with the control system 23, and in particular with the processing system 23-1. Thereby, the control system 23 can provide control instructions to the fans 7-1, 9-1, 11-1, 13-1, 13-2, 15-1 and 17-1 regarding the rotational speed of each fan of the fluid network system 1. Communication between the control system 23 and the fans 7-1, 9-1, 11-1, 13-1, 13-2, 15-1 and 17-1 can either be via wires, or be wireless.

Figure 4:
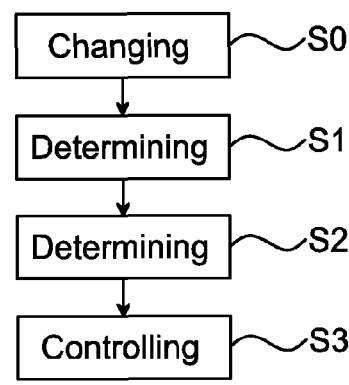
FIG. 4 is a flowchart of method of controlling ventilation in a fluid network system.

When there is a need to identify network characteristics of a fluid network system in which the control system 23 is arranged, such as during commissioning of the fluid network system, the control system 23 provides control signals to each of the fans 7-1, 9-1, 11-1, 13-1, 13-2, 15-1 and 17-1 in a first step S0, as shown in FIG. 4. The control signals contain instructions that each fan is to change its rotational speed. The instructions are preferably provided in a sequential manner with one fan at a time changing its speed.

The change of speed of each fan can be provided by input signal patterns from the control system 23. Such speed change can for instance be achieved by means of frequency converters for providing speed change steps to a respective motor and corresponding fan, or via voltage or current step functions from the respective motor 25 when the motor 25 has received instructions from the control system 23. Steps or step functions may be positive or negative. A step or step function may provide an increase or alternatively a decrease in a fan speed. Other motor signals than steps or step functions are also possible for changing the speed of the fans.

When a motor provides a step to a fan, the change in fluid flow rate associated with that fan is measured. Thus, for instance when the fan speed of fan 7-1 is changed by means of its motor 25, the corresponding change in fluid flow rate is measured by means of sensor 27-1 which is associated with fan 7-1.

Figure 3:
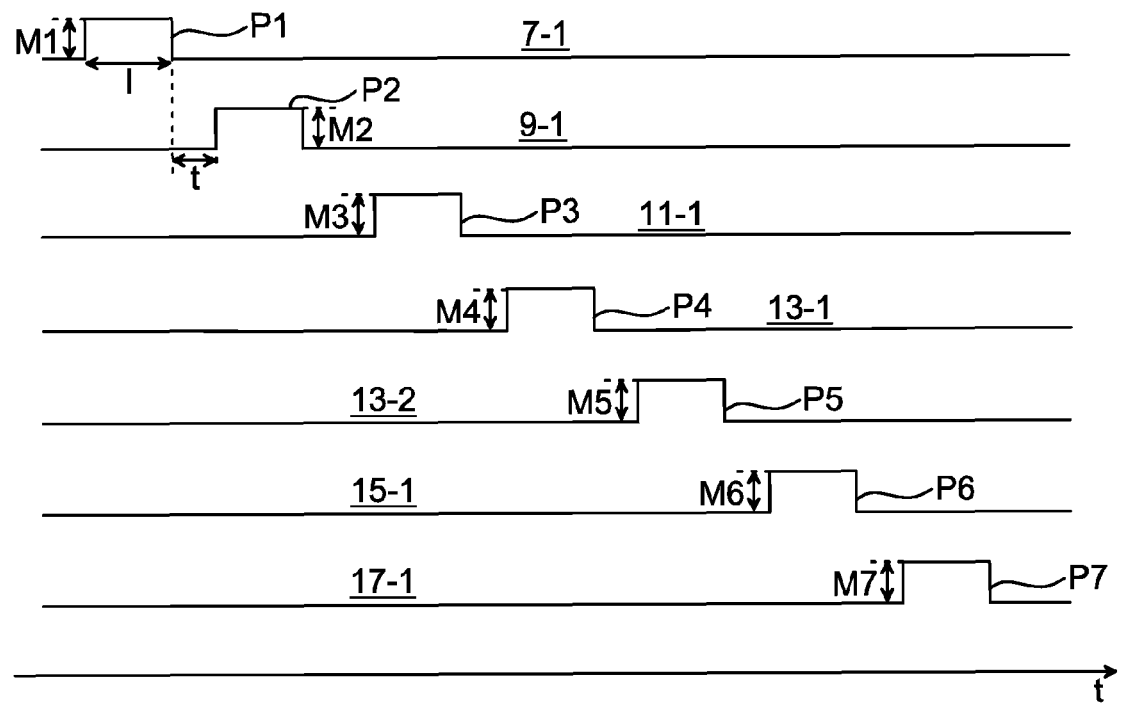
FIG. 3 is a diagram showing sequential speed change of the fans in the fluid network system in FIG. 1.

The change in speed of the fans 7-1, 9-1, 11-1, 13-1, 13-2, 15-1 and 17-2 is in one embodiment made in a sequential manner, as shown in FIG. 3. Each fan 7-1, 9-1, 11-1, 13-1, 13-2, 15-1 and 17-2 is sequentially provided with a respective step or pulse P1, P2, P3, P4, P5, P6 and P7.

For the purposes of determining network characteristics, i.e. determining a relation between the change in fan speed and corresponding change in fluid flow rate, the magnitude M1-M7 of the steps is not a matter of importance. It is sufficient to provide steps having a magnitude which provides a measurable fluid flow rate change. Moreover, each step may have independently determined magnitude. Thus each step magnitude may differ from the magnitude of the other steps. Alternatively, the magnitude of each step P1-P7 can essentially be the same.

The duration I of each step should be sufficiently long for the affected fan to attain steady state operation, i.e. a state where the said fan has obtained the speed corresponding to the step applied to the fan by the motor.

Furthermore, the time t between successive steps should be sufficiently long such that a normal operational state i.e. a steady state in which the fluid network system 1 operated prior to changing any fan speed, can be obtained. Hence, the control system 23 waits sufficiently long between each consecutive step P1-P2, P2-P3, P3-P4, P4-P5, P5-P6 and P6-P7 with the provision of control signals to the motors 25 such that a normal state can be obtained between each step P1-P7.

By changing the fan speeds of each of the plurality of fans one at a time, a relation between a control parameter $\Delta B$ related to the fan speed change and the change in fluid flow rate $\Delta Q$ can be determined in a step S1.

Alternatively and preferably, the relation between the control parameter $\Delta B$ related to the fan speed change and the change in fluid flow rate $\Delta Q$ can be determined by changing the speed of the plurality of fans by providing input signals to the motors and hence the fans in according to any pattern in such a way that each step, i.e. each speed change of a fan, is allowed to settle the fluid flow in the fluid network system while keeping track of the steps applied to the plurality of fans.

To that end, when each fan in the fluid network system has been subject to a speed change, equation (1) below can be solved because the vectors $\Delta B$ and $\Delta Q$ are known.

$$\Delta Q \approx H \cdot \Delta B \quad (1)$$

$\Delta B$ is the control parameter contained in the control signals provided by the control system 23 to the fans 7-1, 9-1, 11-1, 13-1, 13-2, 15-1 and 17-2 via the motors 25. The $\Delta Q$ vector comprises the fluid flow rate changes measured by all the sensors 27-1, 27-2, 27-3, 27-4, 27-5, 27-6 and 27-7. In particular a constant matrix H which approximates the relation between the fan speed changes and the corresponding fluid flow rate changes can be determined. The matrix H may for instance be determined by means of a least squares method.

When the relation between the fluid flow rate change and change in fan speed has been determined, the fans can be controlled optimally, as will be described in the following.

Each fan is associated with an electric power E. The electric power of each fan can analytically be determined by means of equation (2).

$$E = \frac{\Delta p \cdot Q}{\eta} \quad (2)$$

$\Delta p$ is the differential pressure for the fan, Q is the fluid flow rate, and n is the efficiency of the fan. The power E can be for instance be determined from fan characteristic diagrams provided by the fan manufacturer. Preferably, the fan characteristics of each fan are loaded into a memory of the control system 23.

By utilizing the expression in equation (2) for the power E of each fan, or alternatively the estimated total power, together with the constraint that the fluid flow rate Q should equal to or be larger than the minimum required fluid flow rate $Q_{req}$, a minimum total operational power of the fans can be determined while the fans 7-1, 9-1, 11-1, 13-1, 13-2, 15-1 and 17-2 deliver a sufficient fluid flow rate in each fluid flow channel or shaft of the fluid network system 1. Hence, by minimizing the expression in equation (3) herebelow, the total minimum power value of all the fans can be determined, while the individual minimum power value for each fan is given e.g. by the fan characteristics at this total fan power minimum point.

$$Q \geq Q_{req} \quad {}^{min}\Sigma_{k=1}^{n} E_k \quad (3)$$

The integer n is the number of fans in the fluid flow network. Since $\Delta Q(i)=Q(i)-Q(i-1)$ and $\Delta Q \approx H \cdot \Delta B$, equation (3) can be expressed as follows.

$$Q(i-1)+H \cdot \Delta B \geq Q_{req} \quad {}^{min}\Sigma_{k=1}^{n} E_k \quad (4)$$

Thus, the minimum power which provides a minimum required flow rate in the fluid network system can in a step S2 be determined by minimizing the expression in equation (4) where the constraint in the minimization expression involves the relation between the fluid flow rate and the corresponding fan speed, as determined in step S1.

An alternative to the above approach of determining the minimum total fan power can be made as follows. In a first step a relation is estimated between a change in power and the change in fan speed for each fan essentially simultaneously as determining the relation between the change in fan speed and the corresponding change in fluid flow rate. In a second step, the total power change of the fans, i.e. the sum of the estimated power change for each fan is minimized with a constraint involving the relation between the fluid flow rate and the corresponding fan speed. Hence, an estimation of the minimum total fan power is obtained. The process of determining or estimating the minimum total fan power this way comprises estimation of the minimum total fan power using the above-mentioned constraint and subsequently controlling the speed of the fans according to the estimated minimum total fan power, and iterating this process until the difference between successive estimated minimum total fan power values obtained in the iteration process is less than a predetermined value.

Thus, according to the above alternative, the relation in equation (5) herebelow is determined $$\Delta E \approx K \cdot \Delta B \quad (5)$$

where $\Delta E$ is a vector describing the change in power for each fan when there is a speed change in the fans. In order to determine the change in power, $\Delta E_k$, for each fan the power of each motor can be measured e.g. via the frequency converter associated with each fan 7-1, 9-1, 11-1, 13-1, 13-2, 15-1 and 17-2.

The estimation of the relation in equation (5) involves determining the constant matrix K. The relation in equation (5) is minimized with respect to the same constraint as presented in equation (4), as shown in equation 6 herebelow.

$$Q(i-1)+H \cdot \Delta B \geq Q_{req} \quad {}^{min}\Sigma_{k=1}^{n} \Delta E_k \quad (6)$$

As mentioned above, the minimization of the expression in equation (6) provides an estimated minimum total fan power. The fans can be controlled by means of the control system 23 accordingly because ΔB which provides the estimated minimum is known from the minimization, with ΔB being the control parameter contained in the control signals provided by the control system 23 to the fans 7-1, 9-1, 11-1, 13-1, 13-2, 15-1 and 17-2 via the motors 25. The process of minimizing the expression in equation (6) is iterated together with a step S3 of controlling of the speed of the plurality of fans 7-1, 9-1, 11-1, 13-1, 13-2, 15-1 and 17-2 until the difference between successive estimated minimum total fan power values obtained in the iteration process is less than a predetermined value, i.e. when the minimization only provides marginally better results for each iteration.

When the minimum total fan power has been determined, the control system 23 controls each fan to have such a fan speed that the minimum or essentially minimum total power consumption for the fluid network system 1 is obtained. Thus, also in the first case, i.e. when the minimum total fan power is determined by means of the first example as explained in relation to equation (4), step S3 is performed in order to obtain minimum power consumption in the fluid network system 1.

Each of the above steps S0-S3 is typically performed by means of the processing system 23-1.

The present disclosure hence provides a simple way to determine network characteristics of a fluid network system by empirically determining a relation between changes in fan speed and corresponding changes in fluid flow rate. Beneficially, this relation can be used to minimize the total power to be used by the fans in the fluid network system. Thereby electricity can be saved and a reduced environmental footprint can be provided. Furthermore, lower energy consumption also result in lower costs for fluid network system operators.

The skilled person in the art realizes that the present disclosure by no means is limited to the examples described hereabove. On the contrary, many modifications and variations are possible within the scope of the appended claims.

What is claimed is:

1. A method of controlling fluid flow in a fluid network system by means of a plurality of fluid machines, wherein the method comprises:
   a) calculating, via a processor, a relation between a change in fluid machine speed and a corresponding change in fluid flow rate for each of the plurality of fluid machines empirically,
   b) determining, via the processor, a minimum total fluid machine electric power which provides a minimum required flow rate in the fluid network system based on a constraint comprising the relation between the change in fluid machine speed and the corresponding change in fluid flow rate and based on an equation defining each individual fluid machine electric power and expressed as:

$$E = \frac{\Delta p \cdot Q}{\eta},$$

wherein $\Delta p$ is differential pressure for the respective fluid machine, Q is fluid flow rate for the respective fluid machine, and $\eta$ is efficiency of the respective fluid machine, and
   c) controlling, via the processor in communication with the plurality of fluid machines, a speed of each of the plurality of fluid machines such that the minimum total fluid machine electric power in the fluid network system is attained, wherein the steps a)-c) are performed without dynamically modeling real-time locations of machinery and personnel in the fluid network system.

2. The method as claimed in claim 1, comprises prior to determining the relation in step a) changing a fluid machine speed of each of the plurality of fluid machines via the processor.

3. The method as claimed in claim 2, wherein the changing involves sequentially changing the fluid machine speed of each of the plurality of fluid machines.

4. The method as claimed in claim 3, wherein the sequential changing involves changing the fluid machine speed of each fluid machine such that only one fan of the plurality of fluid machines is subject to a change in fluid machine speed at a time.

5. The method as claimed in claim 3, comprising waiting between two subsequent fluid machine speed changes until a fluid flow in the fluid network system returns to an original state in which the fluid network system operated prior to the step of changing a fluid machine speed via the processor.

6. The method as claimed in claim 1, comprising transmitting an input signal pattern from the processor to the plurality of fluid machines to thereby change the fluid machine speed of the plurality of fluid machines, which input signal pattern is applied in such a way that the relation between the change in fluid machine speed and the corresponding change in fluid flow rate can be determined for each fluid machine.

7. The method as claimed in claim 6, wherein the input signal pattern provides for a fluid flow in the fluid network system to settle, wherein the steps applied to the plurality of fluid machines are kept track of.

8. The method as claimed in claim 1, wherein step a) comprises determining, via the processor, a constant matrix defining the relation between the change in fluid machine speed and the corresponding change in fluid flow rate.

9. The method as claimed in claim 1, comprising utilizing fan characteristics for determining the minimum total fluid machine electric power.

10. The method as claimed in claim 1, wherein step b) includes minimizing a sum of each individual fluid machine electric power via the processor.

11. The method as claimed in claim 1, wherein the fluid network system is a ventilation system of an underground mine and wherein the fluid machines are fans.

12. The method as claimed in claim 1, wherein step a) comprises determining, via the processor, a relation between the change in fluid machine speed and a corresponding change in fluid machine electric power for each of the plurality of fluid machines.

13. The method as claimed in claim 12, wherein step b) comprises the following step of:
   b1) estimating, via the processor, a minimum total fluid machine electric power which provides a minimum required flow rate in the fluid network system, the estimation of the minimum total fluid machine electric power being based on the relation between the change in fluid machine speed and the corresponding change in fluid machine electric power for each of the plurality of fluid machines and the constraint comprising the relation between the fluid machine speed and the corresponding change in fluid flow rate;

and, wherein after step c), the method further comprises:
   iterating step b1) and step c) until the difference between successive values of the estimated minimum total fluid machine electric power obtained in the iteration process is less than a predetermined value.

14. A control system for fluid flow control in a fluid network system comprising a plurality of fluid machines, which control system comprises:
- a processing unit arranged to calculate a relation between a change in fluid machine speed and a corresponding change in fluid flow rate for each of the plurality of fluid machines empirically,
- the processing system being arranged to determine a minimum total fluid machine electric power which provides a minimum required flow rate in the fluid network system based on a constraint comprising the relation between the change in fluid machine speed and the corresponding change in fluid flow rate and based on an equation defining each individual fluid machine electric power and expressed as:

$$E = \frac{\Delta p \cdot Q}{\eta},$$

wherein $\Delta p$ is differential pressure for the respective fluid machine, Q is fluid flow rate for the respective fluid machine, and $\eta$ is efficiency of the respective fluid machine, and
- a control unit arranged to control a speed of each of the plurality of fluid machines such that the minimum total fluid machine electric power in the fluid network system is attained, the control unit communicating with the processing unit, wherein the control unit provides fluid flow control without dynamically modeling real-time locations of machinery and personnel in the fluid network system.

15. The control system as claimed in claim 14, wherein the processing unit is arranged to transmit an input signal pattern to the plurality of fluid machines to thereby change the fluid machine speed of the plurality of fluid machines, which input signal pattern is applied in such a way that the relation between the change in fluid machine speed and the corresponding change in fluid flow rate can be determined for each fluid machine.

16. The control system as claimed in claim 15, wherein the input signal pattern provides for a fluid flow in the fluid network system to settle, wherein the steps applied to the plurality of fluid machines are kept track of.

17. The control system as claimed in claim 14, wherein the processing unit is configured to determine a relation between the change in fluid machine speed and a corresponding change in fluid machine electric power for each of the plurality of fluid machines.

18. The control system as claimed in claim 17, wherein:
- the processing unit is configured to estimate a minimum total fluid machine electric power which provides a minimum required flow rate in the fluid network system, the processing unit using the relation between the change in fluid machine speed and the corresponding change in fluid machine electric power for each of the plurality of fluid machines and the constraint comprising the relation between the change in fluid machine speed and the corresponding change in fluid flow rate to perform the estimation of the minimum total fluid machine electric power; and
- the control unit is configured to iterate estimation of the minimum total fluid machine electric power and control of the fluid machine speeds until the difference between successive values of the estimated minimum total fluid machine electric power obtained in the iteration process is less than a predetermined value.

* * * * *